United States Patent [19]
Nelson

[11] Patent Number: 4,799,201
[45] Date of Patent: Jan. 17, 1989

[54] METHODS AND APPARATUS FOR REDUCING CORRELATION SIDELOBE INTERFERENCE IN SEISMIC PROFILING SYSTEMS

[75] Inventor: David E. Nelson, Rochester, N.Y.
[73] Assignee: Hydroacoustics, Inc., Henrietta, N.Y.
[21] Appl. No.: 562,269
[22] Filed: Dec. 16, 1983
[51] Int. Cl.[4] .............................................. G01V 1/36
[52] U.S. Cl. ........................................ 367/41; 367/42
[58] Field of Search .................................. 367/39–46, 367/49, 905

[56] References Cited

U.S. PATENT DOCUMENTS

| | | | |
|---|---|---|---|
| 3,284,763 | 11/1966 | Burg et al. | 367/45 |
| 3,550,073 | 12/1970 | Foster et al. | 367/43 |
| 3,689,874 | 9/1972 | Foster et al. | 367/46 |
| 3,866,161 | 2/1975 | Barr, Jr. et al. | 367/56 |
| 4,037,190 | 7/1977 | Martin | 367/40 |
| 4,223,399 | 9/1980 | Hackett | 367/41 |
| 4,348,749 | 9/1982 | Galbraith | 367/46 |

OTHER PUBLICATIONS

"Vibroseis Encoding" by Thomas Bernhardt, Thesis, University of Durham, Sep. 1977, pp. 1–8.
Rietsch, E., "Reduction of Harmonic Distortion in . . . ," Geophysical Prospecting, vol. 29, 1981, pp. 179–188.
Seriff et al., "Effect of Harmonic Distortion in . . . ," Geophysics, vol. 35, #2, 4/70, pp. 234–246.
Lindsey, J. P., "Elimination of Seismic Ghost Reflections . . . ," Geophysics, vol. 25, #1, 2/60, pp. 130–140.

*Primary Examiner*—Thomas H. Tarcza
*Assistant Examiner*—Ian J. Lobo
*Attorney, Agent, or Firm*—Martin LuKacher

[57] ABSTRACT

In seismic profiling systems utilizing sweeps of signals which change in repetition frequency during the transmission interval, interference results from a spurious correlation against an interfering sweep, usually produced by the first break reflection of a simultaneously transmitted sweep which is in the opposite sense for 3-D surveying or from another source. The first break interfering sweep repeats while correlating with time slipped replicas in surveying for deeper and deeper reflecting interfaces and appears as correlation sidelobe interference which has a significant contribution to the correlator output only when the interfering sweep and the replica are in a condition where their frequencies are identical or nearly so. This condition is known as stationary phase. The interference is reduced without adversely affecting the correlation integral of the sweep reflected from the reflection interface of interest by muting either input to the correlator for a short period of time surrounding the points of stationary phase between the interfering sweep from the first break and the replica or by selectively pre-whitening the received sweep signal prior to correlation. This action effectively removes the first break correlation noise without significantly reducing the correlation of the desired weak reflection with the replica and may also be used to remove harmonic ghost interference. 3-D surveys can therefore be conducted with sources of the upsweep and downsweep operating simultaneously, and surveys can be conducted even in the presence of interference from another source, as on an interfering surveying ship.

28 Claims, 7 Drawing Sheets

METHODS AND APPARATUS FOR REDUCING CORRELATION SIDELOBE INTERFERENCE IN SEISMIC PROFILING SYSTEMS

The present invention relates to methods and apparatus for reducing correlation sidelobe interference in seismic profiling systems using FM sweeps as the signal source; the source sweeping continuously over a long transmission interval of several seconds or more.

The invention is especially suitable for use in 3-D seismic profiling where two sweeps which are orthogonally related are used; usually one sweep increasing in frequency and the other decreasing. The invention is also useful in reducing sidelobe interference in marine seismic profiling arising from a sweep from another source, such as a transducer towed by another ship. The invention is also useful in reducing sidelobe interference from unwanted harmonics of the sweep signal.

The sweep signals may be quasiconstant frequency sine waves, the repetition frequency of which changes slowly as the sweep progresses. The sweep signals may be the so-called Multipulse sweeps produced by trains of pulses of predetermined shape and in predetermined phase relationships varying in repetition frequency over octave harmonic ranges (fundamental, second and fourth harmonic, for example) as described in U.S. Pat. No. 4,188,610 issued Feb. 12, 1980 and U.S. Pat. No. 4,204,278 issued May 20, 1980 to David E. Nelson and assigned to the same assignee as the present application.

At the present time, interference between the two sources, which are towed several hundred feet apart from the seismic ship do not transmit simultaneously, since, even with orthogonal codes, the cross-correlation between the sweeps, which is ten times the logarithm of their time (duration)-bandwidth product, produces noise which can mask the desired weak reflection. For example, if the sweep is 10 seconds long and has a band width or frequency range of 100 Hz, the interference reduction is merely 30 db and can easily mask the correlation of a replica with a deep reflection which may be 45 db down. Accordingly, in 3-D surveys the sources transmit alternately, not simultaneously and the same area must be covered twice, thereby increasing the time to conduct the survey and the expense thereof. Correlation sidelobe interference in a marine seismic profiling system can also arise from sources on a ship (an interfering ship) in the same area, which requires one ship to wait until the other completes its survey.

Sidelobe correlation interference also results from unwanted harmonics of the transmission which correlate with the replica. These harmonics, after reflection from the first break (the interface between the surface of the earth formation and the covering water), overlap the weak reflections from deep reflecting interfaces and produce harmonic ghosts. Such harmonic ghosts can sometimes be eliminated by changing their position in time. This is done by adjusting the rate of the sweep so that the ghost does not occur in the time frame of interest where the weak reflections are anticipated at the detecting sensor; however, in the case of marine prospecting where the ship and the hydrophones move during the survey, adjustment of the sweep rate to place the harmonic ghost in a time region which is not of interest is difficult to achieve.

A serious drawback of sidelobe correlation interference is that the primary reflection from which velocity information may be obtained to calculate the moveouts of signals from different sensors in common depth point (CDP) surveying is masked by the interferences. Attempts to overcome this problem have involved assumptions as to the moveouts (see U.S. Pat. No. 4,208,732 issued June 17, 1980). It is a feature of this invention to eliminate the sidelobe correlation noise which can obscure primary reflections, thereby providing information from which the moveouts can be determined and accurate stacking enabled.

The present invention is operative only where the primary transmission is in the form of a sweep, and preferably a long duration sweep of several seconds or more. Seismic signals which are not sweeps, such as explosions or air gun blasts and seismic signals in the form of random codes, are not susceptible of sidelobe correlation interference reduction in accordance with this invention.

Various techniques have been suggested for eliminating interference due to surface reflections (so-called surface ghosts which may be multipley reflected from the surface of the water and from the bottom (reverberation)). Impulsive sources, usually explosive or air guns, generate the primary signal. The surface ghosts are cancelled by subtracting a delayed version of the primary signal (see Lindsey, *Elimination of Seismic Ghosts Reflections by Means of a Linear Filter,* Geophysics, Vol. 25, No. 1, page 130 (1960) and U.S. Pat. No. 3,866,161 issued Feb. 11, 1975 which shows an implementation of a surface ghost cancellation scheme as proposed in the Lindsey article). Other techniques have involved the use of special filters responsive to reverberation (see U.S. Pat. Nos. 3,284,763, issued Nov. 8, 1966; 3,550,073, issued Dec. 22, 1970; 3,689,874, issued Sept. 5, 1972; and 4,348,749, issued Sept. 7, 1982). The presence of correlation noise and the resulting interference (harmonic ghosts) where sweeps are used in land Vibroseis systems has been recognized and the desirability of getting rid of such harmonic ghosts has been presented (see Seriff and Kim, *The Effect of Harmonic Distortion in the Use of Vibratory Surface Sources,* Geophysics, Vol. 35, No. 2, page 234 (1970) and Rietsch, *Reduction of Harmonic Distortion in Vibratory Source Records,* Geophysical Prospecting, Vol. 29, page 178 (1981)) and proposals have been made to use several sweeps in different phase relationship such that the harmonics cancel (see Rietsch, supra, and Bernhard, *Vibroseis Encoding,* a thesis submitted to the University of Durham, United Kingdom and published by the Graduate Society, September 1977, pages 1–8). A simple and effective method and apparatus for reducing sidelobe correlation noise due to interfering sweeps from interfering source or harmonics in the primary transmission has not as yet been available.

It has been realized, in accordance with the present invention, that for sweep sources of primary signals which are interfered with by other sweeps, correlation noise originates at singular points in the time-frequency plane. This, of course, is not true in the case of random code signals or signals due to explosive or implosive devices, such as explosives and air guns, in that energy from such sources is scattered throughout the time-frequency plane of the signal. The principal source of correlation sidelobe interference in a marine seismic profiling system, it has also been realized, arises from a narrow time interval centered on the first break. In accordance with the invention, the interference is reduced, without adversely effecting the contribution to the correlation detection process from the signal which arises from the primary sweep and its replica, by reducing the first break interference for periods of time which are very much shorter than the sweep duration (e.g., a few tens of milliseconds for a sweep duration of 10 seconds), thereby effectively removing the first break correlation noise without significantly reducing the correlation with the sweep, which may be a much weaker reflection from a subterranean interface.

Briefly described, the invention, as embodied in a marine seismic exploration system using primary sweeps of signals which change in repetition frequency over a frequency range and received at hydrophones, reduces interference in the received reflection signal from interfering sweeps which are received at the hydrophones upon reflection from the first break interface in overlapping time relationship with the primary sweep signals from reflecting interfaces in the earth formation well below the surface thereof. The invention operates by determining intervals of time much shorter than the duration of the sweeps where the replicas of the primary sweeps and the interfering signals as received at said hydrophones correlate with each other. These are points of stationary phase. The primary signals received at the hydrophones are correlated with replicas of the transmitted sweeps, one of which is reduced in amplitude at the determined intervals of time, thereby providing output signals from which correlation noise due to the interfering signal sweeps is reduced preventing masking of outputs due to weak reflections.

Apparatus for implementing the invention may utilize a pre-whitening filter which reduces the amplitude of the correlation noise components in the received signal before correlation. The invention may also be implemented with a time-varying notch filter utilizing the correlator, wherein the amplitude of the signal input to the correlator or the replica input may be reduced for the short intervals during the sweep which give rise to the correlation noise. The location of the intervals may be varied in accordance with the time slip of the replicas in the process of exploring for deeper and deeper reflecting interfaces.

The foregoing and other features and advantages of the invention will become more apparent from a reading of the following description in connection with the accompanying drawings in which.

Figure 1:
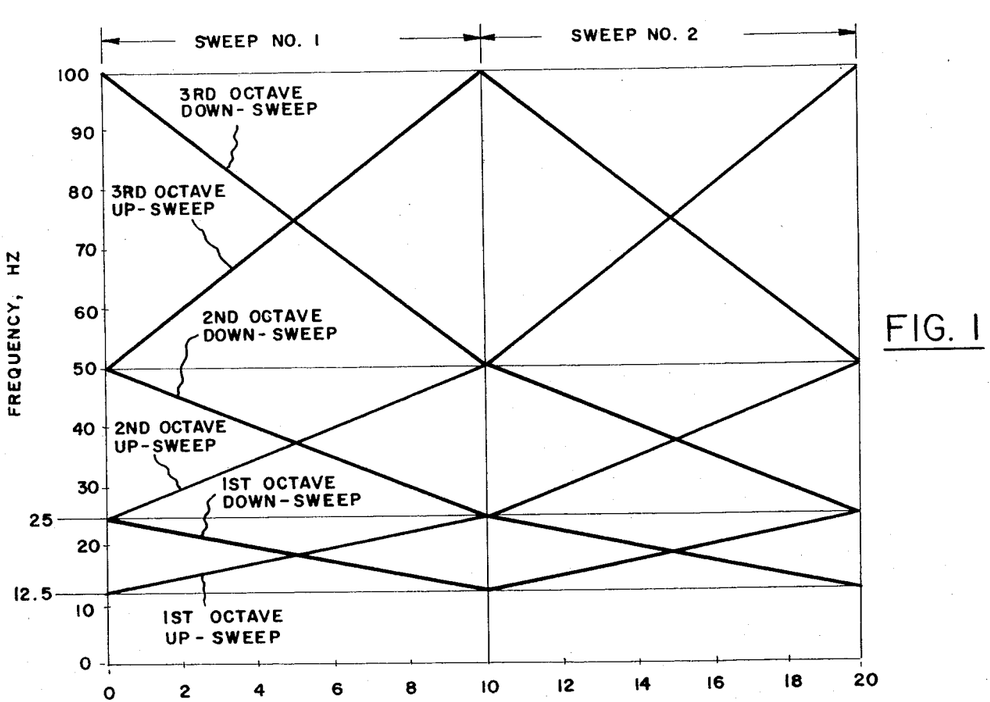
FIGS. 1, 2, 3 and 4 are time frequency plots of a marine seismic surveying system using Multipulse sweeps as described in the above-referenced Nelson patents and showing how the intervals during which correlation interference noise arises are determined.

FIGS. 1-4 show a three octave Mulipulse sweep using two sources for 3-D prospecting. One source sweeps up and the other sweeps down in frequency over an octave frequency range, the fundamental of which extends between 12.5 and 25 Hz in the exemplary case illustrated in these Figures. The Multipulse sweep is an example of an FM sweep in which the repetition frequency changes slowly, in the exemplary case over a 10 second transmission, as the sweep progresses. A Multipulse sweep is somewhat more complex than a vibratory sweep which utilizes only a quasiconstant frequency sine-wave. The fundamental portion of the Figures illustrates the Vibroseis case. Two sweep cycles are shown since in marine profiling, the sources sweep continuously and there will be energy from each adjacent sweep transmitted at all times. FIG. 1 therefore provides time frequency plots for two Multipulse sources operating in 3-D, one upsweeping while the other downsweeps simultaneously. Applicant's invention as described herein is used to reduce the sidelobe interference level between these Multipulse sweeps.

It will become apparent that the source of correlation sidelobe interference arises from a narrow time interval centered on the first break particularly where the primary sweep and the interfering sweep are in stationary phase relationship. Stationary phase relationship is a mathematical principle to the effect that when two sinusoidal functions are multiplied together and the cross-product thereof integrated, significant contributions to the integral arises only when the two frequencies are identical or nearly so.

Figure 2:
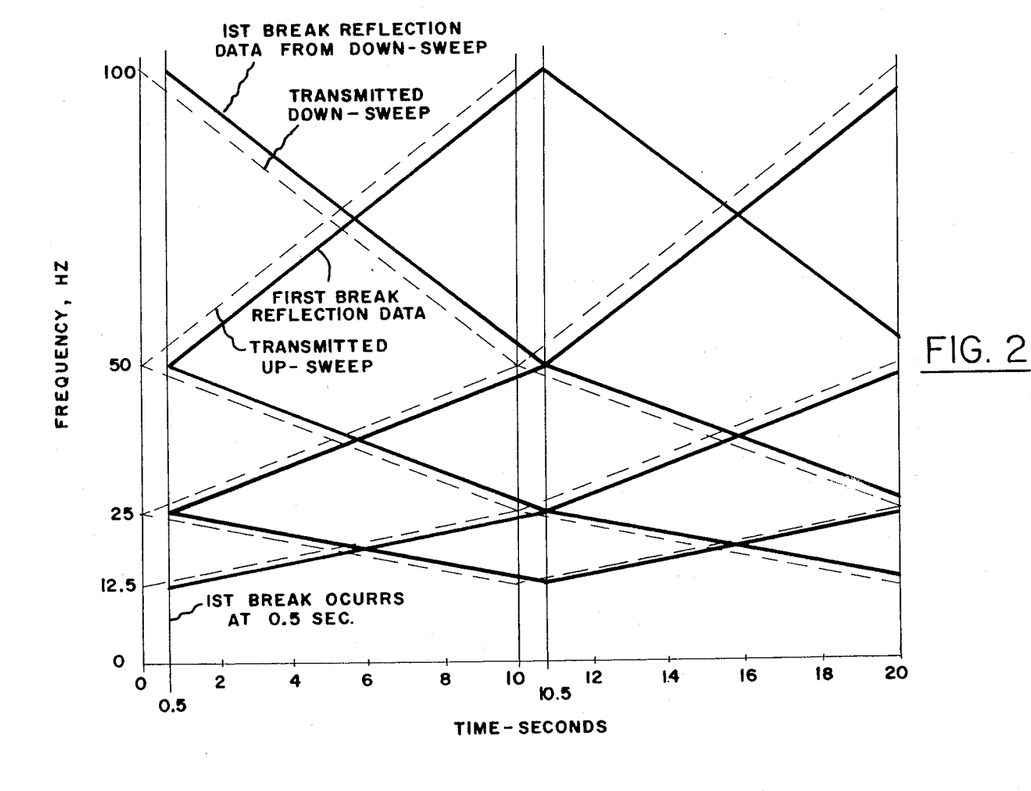

Consider FIG. 2 where energy from the very strong reflection from the first break is added. In FIG. 2 the first break is shown as occurring 0.5 seconds after transmission, by way of example. This delay is set by the depth of the water in the survey area, and the location of the hydrophone group in the streamer. The first break reflection will be the most intense encountered and results in a correlator output containing sidelobes for many seconds. Such sidelobes can obscure a weak reflection arriving at the hydrophones later than the first break arrives thereat.

Figure 3:
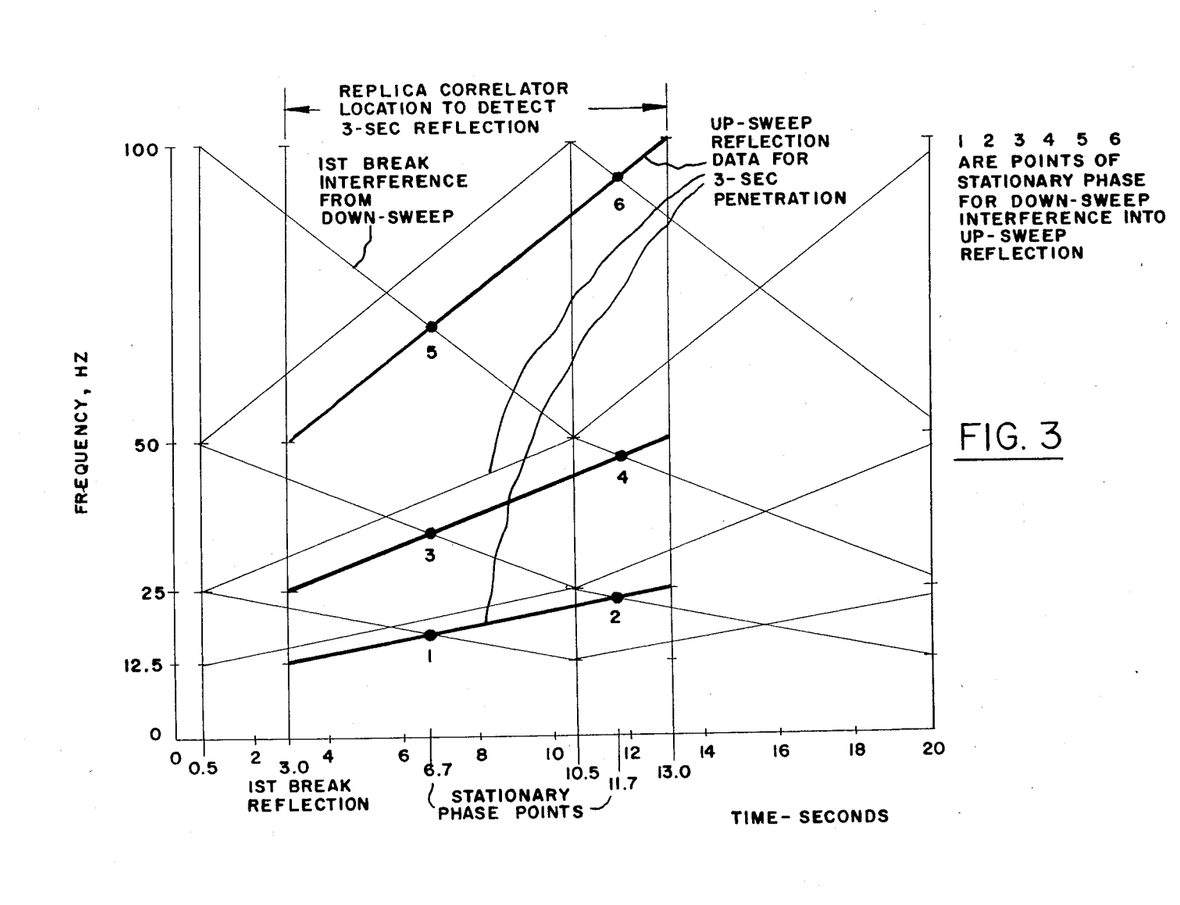

FIG. 3 illustrates the energy from the intense first break. Energy from a weak reflection is also shown. To detect this weak reflection, a replica correlator has to have the proper time delay, three seconds in the case illustrated in FIG. 3, to "match", or detect the energy of the weak reflection.

In the correlator for the Multipulse system, the replica consists of three sinewaves at octave-harmonic frequencies. The fundamental frequency sweeps slowly upward or downward, depending upon which source is to be received. The second and fourth harmonics remain locked to the fundamental as the sweep progresses. The frequency-time plot of the correlator is identical to that of the source transmitted wave form, which, of course, is the definition of a replica correlator. FIG. 3 shows that at six points on the plot, the frequency coming back from the reflection is identical to the frequency coming back (received at a hydrophone) from the intense first break, from the sweep of opposite polarity. No similar situation exists for the sweep of the same polarity. Correlation sidelobe interference does not occur from the sweep from the source which is to be received.

In the correlator, the sum of the three sine waves (the replica) is multiplied against the incoming signal and then the product is integrated. When this cross-product has a steady value, a steady increase takes place in he integral. However, when the cross-product is an oscillatory function with a zero mean value, the output simply varies positively and negatively and never adds a significant value to the integral.

When the inputs to the correlator are both sine waves, or as illustrated in the Figures spectral components of a complex wave form, then the correlator will respond when frequencies at its input are the same. When the frequencies are the same the cross-product of two sinusoidal functions has a DC (direct current) value, while the cross-product of sinusoidal functions of different frequencies is an oscillatory function with no significant DC value.

In the case of a sweep where the correlator is subjected to sine waves of changing (differential) frequency, the cross-product falls between the two extremes (DC value or no significant DC value), and when the frequencies are far apart the cross-product will be oscillatory and no contribution will be made to the integral. When the frequencies are identical, a large contribution results. For slowly changing frequencies the output gradually shifts from one state to the other.

When the frequencies are identical, an interval exists when the phase angle between the two waves does not change. This is the point of stationary phase. This point makes a contribution to the integral. The duration of the point may be infinitesimally short from a mathematical standpoint, but it identifies the time instant when the incoming signals to the correlator, one from the replica and one from the hydrophone, have sinusoidal components of identical frequency.

FIG. 3 shows the points of stationary phase. The replica correlator then multiplies the incoming signal from the hydrophone by a sinusoid of the same frequency as that from the first break of the opposing sweep (the sweep of opposite polarity). Not only is the frequency the same, but the amplitude of the first break is far greater than that of the weak reflector. Then the contribution to the correlation integral from the interfering signal due to the first break is very significant and appears as correlation noise in the output of the correlator. Then the correlator is not able to detect the weak reflection.

Of a critical nature, however, is that the first break interference only contributes to the correlation integral at the instant of stationary phase. The weak reflector provides a signal input to the correlator which contributes to the correlation integral for the full duration of the sweep (10 seconds in the illustrated case). Therefore, the contribution of the first break and the correlation noise may be removed by controlling the correlation process during the intervals of time surrounding the points of stationary phase. Either the replica or the signal may be operated upon. The input to the correlator may be muted for the short intervals of time surrounding the points of stationary phase. These operations have a negligible effect on the correlator output or the weak reflection, because this output builds up for the entire sweep duration (10 seconds), while the first break interference occurs only for a few tens of milliseconds. Muting or otherwise controlling the correlation process effectively removes the first break correlation noise without significantly reducing the correlation of the desired weak reflection.

In the case of the Multipulse sources, there are six points of stationary phase as shown in FIG. 3. It will be noted that points 1, 3 and 5 occur at one time and points 2, 4 and 6 at a second later time. Accordingly, the correlation process need be controlled at two points in time to take care of all six stationary points.

Figure 4:
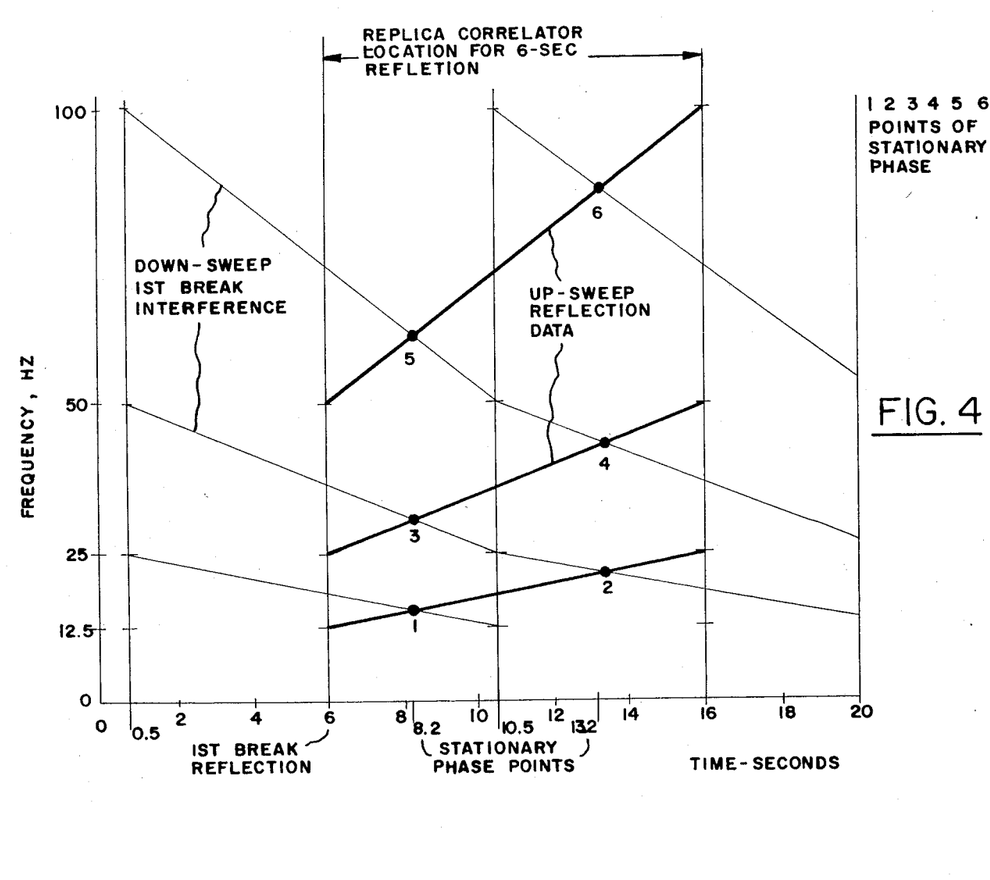

FIG. 4 shows how the points slip in time as the replicas are slipped in time to search deeper subterranean reflecting interfaces.

FIG. 3 shows the points of stationary phase at 6.7 seconds and at 11.7 seconds into the sweep. These points are 3.7 seconds and 8.7 seconds into the replica.

FIG. 4 shows the situation a second or so later when a deeper reflection is being received at the hydrophones. In FIG. 4 the points of stationary phase are at 8.2 and 13.2 seconds into the sweep, which are 2.2 seconds and 7.2 seconds into the replica. It will be observed that for the deeper reflection these points do not occur at the same time in the replica as for the first somewhat shallower reflection. The correlation muting control then has to be varied in time relative to the replica as the correlator is shifted to look for deeper and deeper reflections.

Figure 5:
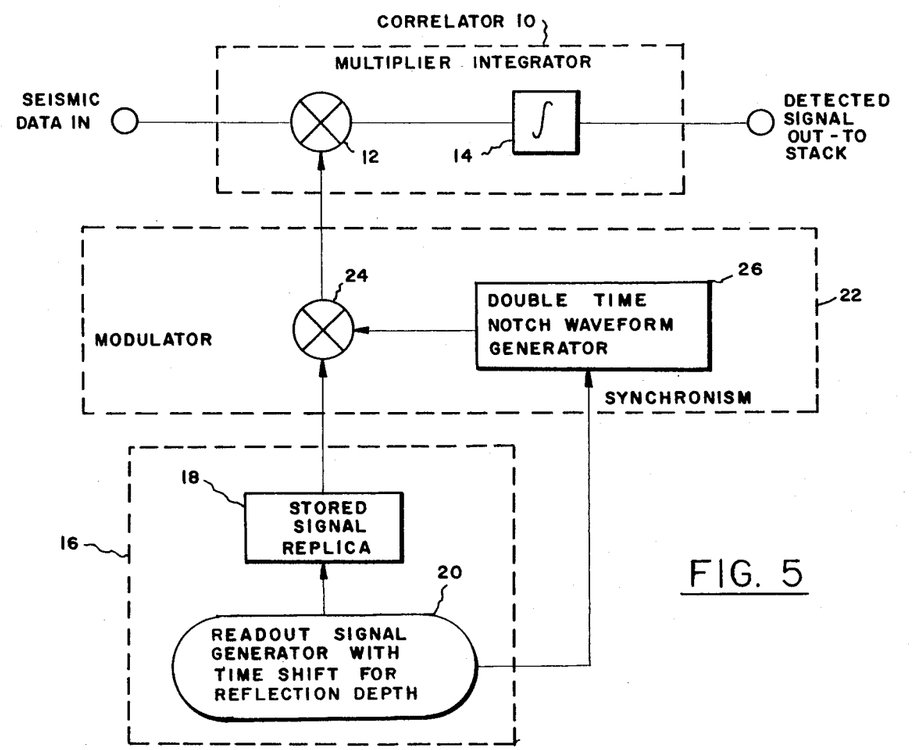
FIG. 5 is a block diagram illustrating a system for use in processing seismic sweep signals to reduce correlation interference noise in accordance with the invention.

FIG. 5 shows an implementation of the invention in the form of a correlation noise interference filter which processes seismic data signals from a hydrophone. Similar apparatus is used with each hydrophone in the array. The system utilizes a correlator 10 made up of a multiplier 12 and an integrator 14. A replica generator 16 stores the replica in memory 18. A readout signal generator with time shift for reflection depth 20 successively reads out the stored signal replica into a modulator 22. The modulator includes a multiplication circuit 24 to which a double time notch wave form is applied from a wave form generator 26. The wave form generator is triggered at the start of each stored signal replica so that the time notches are produced in the replica at the stationary phase points, which points vary with time for each successive replica in order to search for deeper and deeper reflecting interfaces. The amplitude of the replica is therefore adjusted from unity to zero as a function of time and is essentially at zero, thereby reducing the amplitude of the replica at the stationary phase points. The replica is applied to the multiplier 12 of the correlator 10. With no replica reaching the correlator, the contribution to the correlation integral is zero at the time of the notches. The output from the correlator constitutes the detected signal and may be applied to a stacker together with the outputs of correlators which receive signals from the other hydrophones in the system.

Instead of operating upon the replica, the seismic data signal may be operated upon instead. Of course, the correlation noise filter may be implemented with a computer by appropriate programming. Inasmuch as time and frequency are uniquely related by the sweep rate, a time varying band rejection filter may be used, either on the replica or on the incoming signal. In the Multipulse system where the Multipulse signal has three components which are octave harmonics, three such frequency filters would be required. Accordingly, a time filter as shown in FIG. 5 is preferable. The wave form generator 26 of the filter preferably does not abruptly turn on and off to generate the notch, since such abrupt changes can introduce spectral spreading and correlation noise. The wave form therefore gradually turns on and off during the notch interval, such as with an inverted cosine bell shape.

Figure 6:
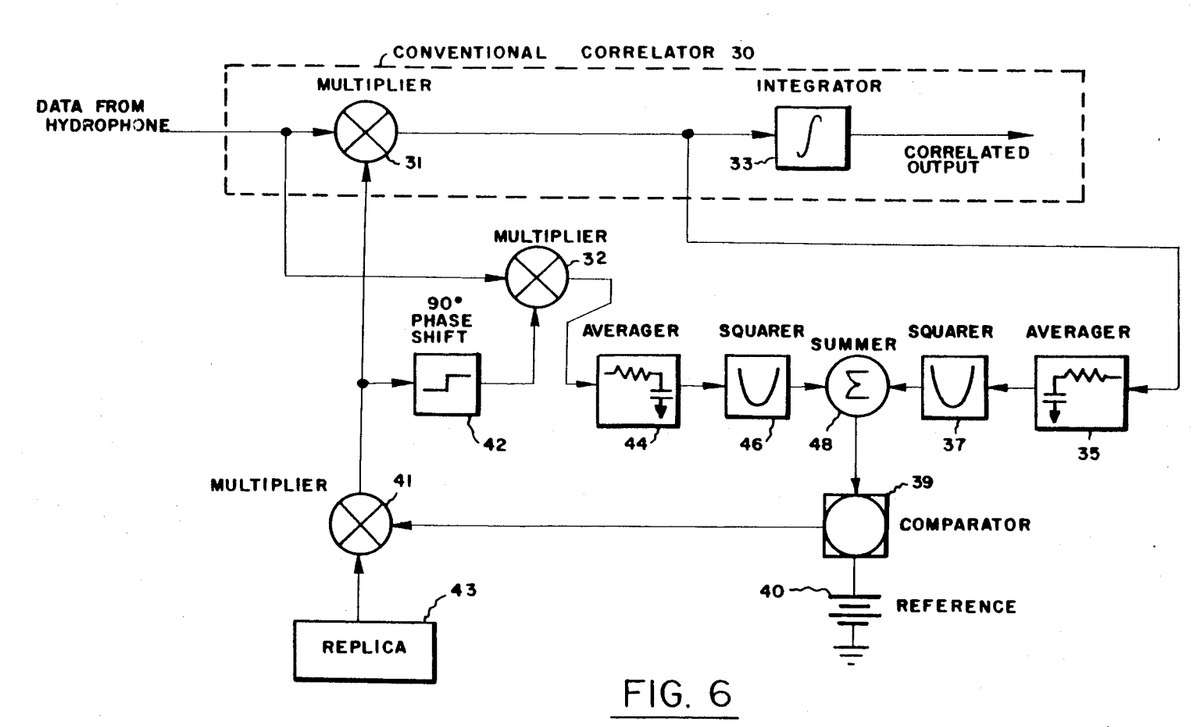
FIG. 6 is a block diagram of a system for use in processing seismic sweep signals using a prewhitening correlator to reduce correlation interference noise in accordance with the invention.

Referring to FIG. 6 there is shown a prewhitening correlator which serves to equalize the signal, thereby preventing the introduction of correlation noise due to the interfering sweep from the first break, or from other nearby seismic survey ships.

The prewhitening correlator is shown in FIG. 6; however before discussing of the action of this correlator in detail, consider what it does. It has the effect of examining the incoming data which is received from the source (e.g., the hydrophone; and wherever a particular frequency has a particularly high amplitude, the amplitude of that particular frequency is reduced so that it is more nearly equal to the amplitudes of other frequencies in its neighborhood. It should be obvious that in the case of the reflection from the first break, a series of particular frequencies have particularly high amplitudes at particular times because of the reflection from the break. In the system shown in FIG. 5, these amplitudes were reduced by the notch modulator directly. In the pre-whitening correlator, the same action will take place, although the frequencies will not be entirely eliminated as they are with the notch, but merely reduced to the average value of all frequency components.

One other difference is important to note. The FIG. 5 system requires knowledge of the time of the first break in order to set the frequencies of the notches. The pre-whitening correlator on the other hand is fully automatic, needing no knowledge of the incoming interference. Hence, the pre-whitening correlator will work effectively when the interference arises from another seismic crew surveying in the same vicinity; for no matter when its interference arrives, or what signal form is being employed, the pre-whitening correlator will suppress the interference from the other crew, whenever it arrives.

Referring to FIG. 6, it will be seen that the incoming data is applied to multiplier 31, and if the replica from source 43 is also applied directly to the same multiplier, whose output is integrated by an integrator 33, then the processing would be identical to a conventional correlator 30. The remaining components constitute the pre-whitening function.

To understand the pre-whitening action, it is first important to understand that the output of the replica is a signal consisting of one or more slowly varying sinusoidal functions. This signal is passed directly to the multiplier 31, and it is also shifted in phase by 90° (in quadrature) and applied to a second multiplier 32. Thus, the incoming data is first multiplied by a signal effectively consisting of a sine and a cosine wave, or waves if more than one spectral component is present.

The output of each multiplier 31 and 32 is applied next to averagers 35 and 44, whose time constant is in the order of a few tenths of a second. In other words, the time constant is longer than the periods of the frequencies present, but short compared to the duration of the sweep (e.g., 10 seconds).

The process thus far has been to multiply the incoming signal by a sine wave and by a cosine wave, and then integrate for a short period of time. This is exactly the form of a spectrum analyzer, which detects the energy present in the incoming wave at the frequency of the sinusoid present in the replica. The two averager outputs represent the real and imaginary parts of the spectrum. When these are squared in squarers 46 and 37, and added in a summer 48, then the output of the summer 48 is the energy of the incoming data in a frequency band centered at the replica frequency with a bandwidth equal approximately to the inverse of the averaging time.

This energy is then compared to a reference 40 by comparator 39. The output of the comparator acts on a multiplier 41 which controls the amplitude of the replica going to the correlator 30. The comparator 39 is connected in such a sense that, if the incoming energy exceeds the reference, the signal to the multiplier 31 is such as to reduce the multiplier input and therefore reduce the amplitude of the replica applied to the correlator 30. This action, in turn, reduces the product of the multipliers 31 and 32 against the incoming data, until the energy from summer 48 falls to the reference level.

In taking this action, the pre-whitened correlator has reduced or augmented the effective strength of the incoming signal with a specific frequency band to a standardized value, normalizing its contribution to the correlation integral being collected in the integrator 33. Thus, when a strong interference is present, its effect on the correlated sum is not allowed to be proportionally as great as it would have been without the pre-whitening action. Conversely, when only a weak reflection is incoming, its contribution is enhanced.

As pointed out earlier in the case of the notch system (FIG. 5), the multiplier 41 could equally well be placed in series with the data input instead of in series with the replica source.

It should also be apparent to those skilled in the art that because of the particular signal present in the replica, this pre-whitening correlator may be alternately described as a frequency-selective automatic-gain-control system. However, it is substantially more general in its action, for it has the effect, in this implementation, of equalizing a complete time-frequency plane no matter how the energy is distributed within this plane, as contrasted simply to a single frequency selective AGC system.

Figure 7:
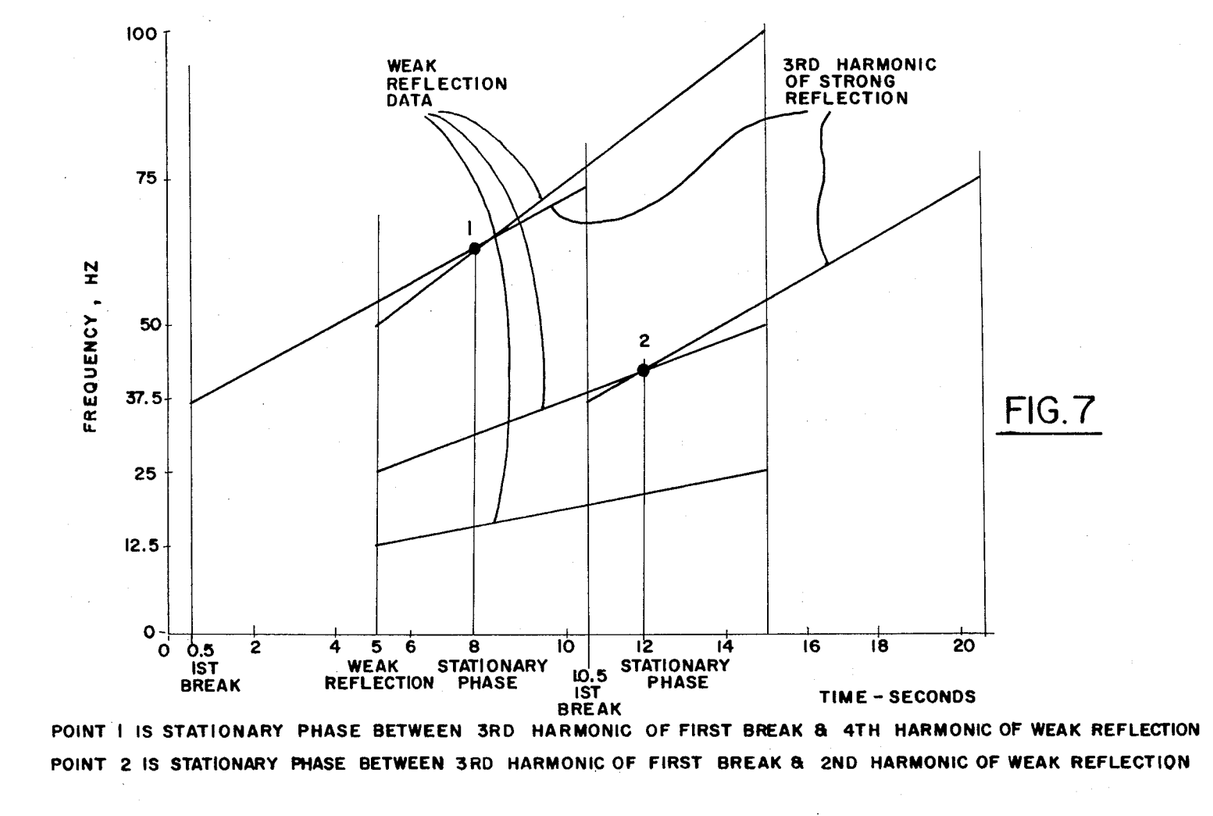
FIG. 7 is a time frequency plot showing how the harmonic ghosts may arise.

FIG. 7 shows the time-frequency relation in a situation in which harmonic ghosting is present. In the figure, it is assumed that the sound source improperly radiates a third harmonic signal, which is undesired but present because of imperfections in the source itself, or because of non-linearities in the coupling between the source and the medium. This latter effect is very important in land seismic operations, though less so in marine operations. The strong reflection from the first break, therefore, is contaminated by third harmonic distortion as depicted in the figure as extending from 37.5 Hz at 0.5 seconds to 75 Hz at 10.5 seconds, and repeating.

The figure also depicts the first, second and fourth harmonics from a weak reflection at 5 seconds. The replica correlator, as described before, will be looking for these harmonics. It is apparent that at points 1 and 2, a frequency in the replica and the third harmonic distortion cross, at points of stationary phase. These points give rise to harmonic ghosting.

The dual notch filter described heretofore and depicted in FIG. 5 can be employed to eliminate these points of stationary phase, changing only the moments of time at which the notches are to be employed. The times are directly computable, in advance, from knowledge of the time of the first break, and the slip time of the replica. Thus, the Double Notch Waveform Generator 26 of FIG. 5 is simply re-programmed to provide the notches at the correct times to eliminate harmonic ghosting.

From the foregoing description it will be apparent that there has been provided improved methods and apparatus for the processing of seismic signals to reduce sidelobe correlation noise. Variations and modifications of the herein described methods and apparatus, within the scope of the invention, will undoubtedly suggest themselves to those skilled in the art. Accordingly, the foregoing description should be taken as illustrative and not in a limiting sense.

I claim:

1. In a marine seismic exploration system using primary sweeps of signals which change in repetition frequency over a frequency range during the duration of said sweeps and which are received at hydrophones, the method of reducing interference in reflection signals received at said hydrophones from interfering sweeps which are received at said hydrophones upon reflection from the first break interface between the surface of an earth formation and the water covering said formation in overlapping time relationship with the primary sweep signals from reflecting interfaces in said formation below the surface thereof, which comprises determining intervals of time much shorter than the duration of said sweeps where said interfering signals and replicas of said primary sweeps received at said hydrophones correlate with each other, indicating points of stationary phase and correlating said primary signals received at said hydrophones with replicas thereof, one of which is reduced in amplitude at said intervals.

2. The method according to claim 1 where said replicas are successively slipped in time to explore for interfaces at successively greater distances below the surface of the formation, and further, comprising delaying the times of occurrence of said intervals of reduced amplitude in accordance with the time slip in said replicas upon the correlation thereof with each of said successive replicas.

3. The method according to claim 1 wherein said reduction in amplitude is carried out by equalizing the amplitude of said received primary signals.

4. The method according to claim 3 wherein said equalizing step is carried out by passing said received primary signals through a time varying prewhitening correlator.

5. The method according to claim 1 wherein said correlating step is carried out by reducing the amplitude of one of said replica and received primary signal at said intervals, multiplying said received primary signal and said replica, and integrating the resulting product.

6. The method according to claim 1 wherein said correlating step is carried out by passing one of said received primary signal and said replica through a filter having notches at frequencies corresponding to said intervals, and then passing said filtered primary and replica signals through a correlator.

7. The method according to claim 5 further comprising the step of slipping said replicas in time in successive steps to provide successive time slipped replicas, said correlating step is carried out synchronously with said successive replicas, and said reducing step is carried out with said intervals displaced in time in accordance with the time slip of said replicas.

8. The method according to claim 6 wherein said frequencies corresponding to said intervals are varied in each successive correlation in accordance with the time slip of said replicas used therein.

9. In the processing of received signals from reflecting interfaces in an earth formation which result from transmissions of seismic signals which sweep in frequency over a frequency range during the intervals of said transmissions and which received signals are correlated in a correlator with replicas to locate said interfaces, the method of reducing noise due to simultaneous transmissions which result in received signals which match said replicas, comprising the steps of muting the input to said correlator from said replica or said received signals for a certain period of time much smaller than the interval of said transmission while received signal and replica are being correlated, thereby indicating points of stationary phase and varying the time during each of said correlations when said muting occurs in accordance with the delay between said replica and said transmission.

10. The method according to claim 9 wherein said certain period of time occurs whenever said received signals from said simultaneous transmissions and said replicas are in stationary phase relationship.

11. The method according to claim 10 wherein said muting step is carried out with the said of a time-varying notched filter wherein the notches are located at frequencies corresponding to the location of said certain period, and said time varying step comprises the steps of synchronizing said filter with said delay during each said correlations.

12. The method according to claim 10 wherein said muting step is carried out by turning said replica off and on for the duration of said periods.

13. The method according to claim 10 wherein said muting step is carried out with the aid of a wave form generator which generates a wave form with a notch during each said periods, and multiplying said replica by said wave form to provide said notch therein, and said time varying step is carried out by generating said wave form in synchronism with each said replicas and varying the location and time of said notch in said wave form in accordance with the delay of said replica used in each said correlations.

14. In a marine seismic exploration system using primary sweeps of signals which change in repetition frequency over a frequency range during the duration of said sweeps and which are received at hydrophones, a system for reducing interference in reflection signals received at said hydrophones from interfering sweeps which are received at said hydrophones upon reflection from the first break interface between, the surface of an earth formation and the water covering said formation in overlapping time relationship with the primary sweep signals from reflecting interfaces in said formation below the surface thereof, which comprises means for determining intervals of time much shorter than the duration of said sweeps where said interfering signals and replicas of said primary sweeps received at said hydrophones correlate with each other, indicating points of stationary phase and means for correlating said primary signals received at said hydrophones with replicas thereof, one of which is reduced in amplitude at said intervals.

15. The invention according to claim 14 where said replicas are successively slipped in time to explore for interfaces at successively greater distances below the surface of the formation, and further comprising means for delaying the times of occurrence of said intervals of reduced amplitude in accordance with the time slip in said replicas upon the correlation thereof with each of said successive replicas.

16. The invention according to claim 14 wherein said correlating means includes means for equalizing the amplitude of aid received primary signals to provide the reduction in amplitude.

17. The invention according to claim 16 wherein said equalizing means comprises a time varying pre-whitening filter for processing the received primary signals.

18. The invention according to claim 14 wherein said correlating means comprises means for reducing the amplitude of one of said replica and received primary signal at said intervals, means for multiplying said received primary signal and said replica, and means for integrating the resulting product.

19. The invention according to claim 14 wherein said correlating means comprises means for a filter having notches at frequencies corresponding to said intervals through which one of said received primary signal and said replica is passed, and a correlator through which said filtered primary and replica signals is passed.

20. The invention according to claim 18 further comprising means for slipping said replicas in time in successive steps to provide successive time slipped replicas, means for operating said correlator synchronously with said successive replicas, and reducing means has means for displacing said intervals displaced in time in accordance with the time slip of said replicas.

21. The method according to claim 19 wherein said correlating means includes means for varying said frequencies corresponding to said intervals in each successive correlation in accordance with the time slip of said replicas used therein.

22. In a system for processing of received signals from reflecting interfaces in an earth formation which result from transmissions of seismic signals which sweep in frequency over a frequency range during the intervals of said transmissions and which received signals are correlated in a correlator with replicas to locate said interfaces, apparatus for reducing noise due to simultaneous transmissions which result in received signals which match said replicas, comprising means for muting the input to said correlator from said replica or said received signals for a certain period of time much smaller than the interval of said transmission while said received signal and replica are being correlated, thereby indicating points of stationary phase and means for varying the time during each of said correlations when said muting occurs in accordance with the delay between said replica and said transmission.

23. The invention according to claim 22 further comprising means for operating said muting means whenever said received signals from said simultaneous transmissions and said replicas are in stationary phase relationship.

24. The invention according to claim 23 wherein said muting means comprises a time-varying notched filter wherein the notches are located at frequencies corresponding to the location of said certain period, and said time varying means comprises means for synchronizing said filter with said delay during each said correlations.

25. The invention according to claim 24 wherein said muting means includes means for turning said replica off and on for the duration of said periods.

26. The invention according to claim 23 wherein said muting means comprises a wave form generator which generates a wave form with a notch during each said periods, and means for multiplying replica by said wave form to provide said notch therein, and said time varying means comprises means for generating said wave form in synchronism with each said replicas and varying the location and time of said notch in said wave form in accordance with the delay of said replica used in each said correlations.

27. The invention according to claim 22 wherein said muting and time varying means are provided by pre-whitening correlator means.

28. The invention according to claim 27 wherein said pre-whitening correlator means comprises a correlator having a multiplier and an integrator, a second multiplier, a 90° phase shifter, a pair of amplifiers, a pair of squarers, a summer, a source of reference energy, a third multiplier, one of said received signals and said replica being applied to said first and second multipliers and the other of said received signals and said replica being applied to said third multiplier and to said second multiplier phase shifted 90° in said phase shifter, the output of sad first multiplier and second multiplier being respectively averaged, squared and summed in different ones of said averagers and squarers and in said summer, the output of said summer being compared with said reference in said comparator to provide an input to said third correlator.

* * * * *